United States Patent [19]

Meguro et al.

[11] Patent Number: 5,419,943
[45] Date of Patent: May 30, 1995

[54] MAGNETIC RECORDING MEDIUM HAVING A MAGNETIC LAYER WITH A TG OF 80° C. TO 100° C.

[75] Inventors: Katsuhiko Meguro; Mikihiko Kato; Tetsuji Nishida; Minoru Kanazawa; Makoto Yoshimura, all of Kanagawa, Japan

[73] Assignee: Fuji Photo Film Co., Ltd., Kanagawa, Japan

[21] Appl. No.: 144,317

[22] Filed: Nov. 1, 1993

[30] Foreign Application Priority Data

Oct. 30, 1992 [JP] Japan ................................. 4-314246
Dec. 1, 1992 [JP] Japan ................................. 4-343639

[51] Int. Cl.⁶ .............................................. G11B 5/00
[52] U.S. Cl. .................................. 428/141; 428/317.9; 428/323; 428/328; 428/336; 428/694 BR; 428/900; 360/125
[58] Field of Search ............... 428/323, 328, 141, 336, 428/317.9, 900, 694 BR; 360/125

[56] References Cited

U.S. PATENT DOCUMENTS

| 4,833,019 | 5/1989 | Suwarnasaru | 428/336 |
| 5,178,925 | 1/1993 | Endo et al. | 428/64 |
| 5,196,265 | 3/1993 | Ryoke et al. | 428/332 |

FOREIGN PATENT DOCUMENTS

| 0463601 | 1/1992 | European Pat. Off. | G11B 5/702 |
| 60-35243 | 8/1985 | Japan | B29C 43/46 |
| 2310821 | 12/1990 | Japan | G11B 5/70 |
| 461617 | 2/1992 | Japan | G11B 5/702 |
| 469813 | 3/1992 | Japan | G11B 5/704 |
| 4146518 | 5/1992 | Japan | G11B 5/704 |

Primary Examiner—Stevan A. Resan
Attorney, Agent, or Firm—Sughrue, Mion, Zinn, Macpeak & Seas

[57] ABSTRACT

A magnetic recording medium is disclosed, comprising a nonmagnetic support having thereon a magnetic layer, said magnetic layer comprising ferromagnetic particles and a binder, wherein nonmagnetic support has a transverse-direction Young's modulus of at least 1,000 Kg/mm², said magnetic layer has a glass transition temperature of 80° to 100° C., and said magnetic recording medium has a total thickness of less than 12 μm, and further a magnetic recording medium is disclosed, comprising a nonmagnetic support having thereon a magnetic layer, said magnetic layer comprising ferromagnetic particles and a binder, wherein said magnetic recording medium is adapted for use with a magnetic head having a core width of at least 100 μm at a speed of at least 20 m/sec based upon relative speed of said recording medium and said head, said nonmagnetic support has a transverse-direction Young's modulus of at least 1,000 Kg/mm², said magnetic layer has a glass transition temperature of from 80° to 100° C., and said magnetic recording medium has a total thickness of less than 12 μm.

10 Claims, No Drawings

MAGNETIC RECORDING MEDIUM HAVING A MAGNETIC LAYER WITH A TG OF 80° C. TO 100° C.

FIELD OF THE INVENTION

The present invention relates to a magnetic recording medium including a magnetic layer and a nonmagnetic support and, more particularly, a magnetic recording medium having improved head contacting properties in a video tape recorder (VTR), especially a digital VTR, high output with little output fluctuation, and a magnetic recording medium which is less likely to cause drop outs.

BACKGROUND OF THE INVENTION

Magnetic recording media for audio use, video use, computer use (disks and memory tapes), and the like, generally include a nonmagnetic support and a magnetic layer provided thereon. The magnetic layer includes ferromagnetic particles dispersed in a binder.

In recent years, the practical recording mode for these magnetic recording media has shifted from conventional analogue recording to digital recording in which there is less chance that the recorded information will deteriorate upon dubbing.

Magnetic recording media for digital recording must be capable of high density recording because more signals are recorded in digital recording than in analogue recording, and because VTRs and magnetic tapes must have high picture and sound quality, but at the same time be capable of being miniaturized in order to save space.

In order to attain high density recording, it is necessary that magnetization transition in a medium occur along a recording track at distances which are as short as possible. Shorter wavelength signals are therefore used. Accordingly, it is necessary to reduce the size of ferromagnetic particles used in the medium, increase the packing density of the ferromagnetic particles in the medium and increase the smoothness of the surfaces of the medium to an ultrahigh degree. At the same time, the speed of writing on magnetic tapes and in this regard the speed of reading magnetic tapes should be as high as possible and increased cylinder revolutions per unit time, magnetic tape running speed, etc. are desired.

Reduced cylinder head diameter is required in order to miniaturize VTRs and magnetic recording media. Reduced recording track width of magnetic tapes is required in order to improve recording density to area. Reduced thickness is required in order to improve volumetric density. For a tape as thin as about 11 μm, it is extremely difficult to make the tape run in a stable manner at a speed as high as 20 m/sec or higher, based upon relative speed of the tape and a small-diameter head revolving at a rate as high as about 5,400 to 9,000 rpm. There is a tendency for the Rf output to be decreased and output fluctuation to become greater as the magnetic tapes become thinner.

In a D3 system [normalized in SMPTE (Society of Motion Picture and Television Engineers)] used as a digital VTR, where the magnetic tape/magnetic head relative speed is as high as 20 m or higher and the head core width is as large as 100 μm or more, spacing between the magnetic head and the magnetic tape is increased and head contact by the magnetic tape becomes so poor that a reduced output occurs.

Carbon black and nonmagnetic particles having a Mohs' hardness of 8 or higher, which are called abrasives, are conventionally used in magnetic tapes in order to achieve certain running and antistatic properties and head-cleaning properties. However, head abrasion due to the presence of such particles tends to become more severe when the magnetic tape/head relative speed increases.

In order to control such head abrasion, the abrading properties of magnetic tape are controlled so as to be within a certain range. Also, a magnetic head having an increased head core/tape contact area is used. The increased contact area is achieved by enlarging the width of the part of the head which a magnetic tape slides on (i.e., the width of the magnetic head core), in a direction perpendicular to the head travel direction.

However, increased magnetic head area tends to decrease Rf output and enhance output fluctuation. This is due to uneven contact between the magnetic tape and the head resulting from, e.g., the attraction of the magnetic tape toward the aperture into which the head chip of cylinder head has been fitted. The uneven contact between the magnetic tape and the head is caused by spacing between the magnetic tape and the head which results in loss during recording and reproduction further causing a decrease in output and output fluctuation.

These problems are severe, particularly in video tapes used in VTRs for broadcasting, such as the D3 or D2 systems [normalized in SMPTE (Society of Motion Picture and Television Engineers)], in which digital signals can be recorded and reproduced.

The loss (Ls) caused by reproduction can be expressed by the following equation:

$$Ls = 54.6(d\,[\mu m]/\lambda[\mu m])\,(dB) \qquad (1)$$

wherein d [μm] is a spacing between the magnetic tape and the head and λ[μm] is a recording wavelength. The spacing between the magnetic tape and the head is determined by the pressure of air flowing between the magnetic tape and the head and by the stiffness of the magnetic tape. Problems such as those described above are caused by the fact that the magnetic tape has relatively low stiffness, mainly in the transverse-direction.

The stiffness (M) of a magnetic tape can be expressed by the following equation:

$$M = Ebd^3/12 \qquad (2)$$

wherein E is the Young's modulus of the base in the transverse-direction, b is the width of the magnetic tape, and d is the thickness of the magnetic tape. It will be appreciated from equation (2) that in order to improve the stiffness of magnetic tape in a transverse-direction, the transverse-direction Young's modulus of the base should be increased, and the total thickness of the magnetic tape should be increased. Examples of magnetic tape having a base with an increased transverse-direction Young's modulus are disclosed in JP-A-50-46303 (the term "JP-A" as used herein means an "unexamined published Japanese patent application"), JP-A-54-34206, JP-A-62-234233, JP-A-63-197643, JP-A-63-212549, JP-A-2-20924, JP-A-4-49515, JP-A-4-69813, and U.S. Pat. Nos. 4,804,736, 4,833,019 and 5,196,265 (corresponding to JP-A-4-146518), the disclosures of which are herein incorporated by reference. In these applications and patents, poly(ethylene terephthalate)

(strengthened PET), poly(ethylene 2,6-naphthalate) (PEN), aromatic polyamides (aramids), and composite polyesters, having an increased transverse-direction Young's modulus which is higher than ordinary are used. However, sufficient magnetic tape stiffness cannot be maintained by increasing the Young's modulus in the transverse-direction as discussed above alone if the thickness of the tape is reduced because the stiffness of a magnetic tape is proportional to the third power of the tape thickness. In order to obtain a magnetic tape which is suitable for running on a head having a track width of 20 $\mu$m and a sliding surface width of about 80 $\mu$m, as measured along a direction perpendicular to the scan direction, a base thickness of at least 9 $\mu$m is necessary for poly(ethylene terephthalate) (PET) films. The thickness of the base becomes significant when the sliding surface width of the head, as measured along a direction perpendicular to the scan direction, is increased. If the width of the sliding surface as measured along a direction perpendicular to the scan direction is increased to about 130 $\mu$m, even a PEN or aramid base having an increased transverse-direction Young's modulus must have a thickness of at least 9 $\mu$m.

Another method for increasing stiffness of magnetic tape is to form a layer of a nonmagnetic metal, such as aluminum, on a PET base by vapor deposition or the like as described in JP-A-54-74706. However, this method is not practical because it is costly.

Increasing packing density of ferromagnetic powders on a magnetic tape by metal-metal calendering during the calendering treatment of the tape, as described in JP-B-60-35243, is known as a method for obtaining a high-output magnetic recording medium. (The term "JP-B" as used herein means an "examined Japanese patent publication".) However, the hardness of the magnetic layer is increased and cushioning properties of the magnetic tape are reduced during such calendering because the surface void content of the magnetic layer is reduced. This reduces the head contacting ability of the magnetic tape. Thus, sufficiently high output has not been obtained.

In summary, the prior art method, in response to a trend toward digital systems have sought to increase the amount of information recorded. The response to a trend toward higher-density recording and higher output, the prior art has sought to improve volumetric density of magnetic recording media (hereinafter also referred to simply as "media"). However, higher loading densities of magnetic materials, reducing the thickness of magnetic tapes, and increasing head-medium relative speed, has caused a reduction of head contact and an increase of magnetic head abrasion. Increasing head core width and the reduction of cushioning properties of magnetic layers has caused further deterioration of head contacting properties and output.

The techniques described above have failed to sufficiently improve output so as to compensate for the decrease of output caused by uneven head contact by magnetic tapes due to a reduction in thickness of the tapes, an increase in density of ferromagnetic particles on the tapes, and an increase in width of the sliding surfaces of heads.

SUMMARY OF THE INVENTION

An object of the present invention is to provide a magnetic recording medium having improved head contacting properties when used with VTRs, especially digital VTRs, and high output.

The object of the present invention and other objects are accomplished by a magnetic recording medium in accordance with the present invention which a tape-form nonmagnetic support having thereon a magnetic layer wherein the magnetic layer comprises ferromagnetic particles and a binder; the nonmagnetic support has a transverse-direction Young's modulus of at least 1,000 Kg/mm$^2$; the magnetic layer has a glass transition temperature ($T_g$) of 80° to 100° C.; and the total thickness of the magnetic recording medium is less than 12 $\mu$m. The magnetic recording medium of the present invention is particularly suitable for use with a magnetic head having a core width of at least 100 $\mu$m at a speed of at least 20 m/sec, based upon relative speed of the recording medium and the head.

DETAILED DESCRIPTION OF THE INVENTION

The present inventors have found that by employing a nonmagnetic support having a transverse-direction Young's modulus of at least 1,000 Kg/mm$^2$ and regulating the glass transition temperature of the magnetic layer to 80° to 100° C., preferably 85° to 95° C., the mechanical properties of the whole magnetic recording medium can be improved and, hence, the magnetic tape can have improved head contacting properties and high recorded signal output. The present invention has been completed based on the above finding.

If the transverse-direction Young's modulus of the nonmagnetic support is less than 1,000 Kg/mm$^2$, edge cracking occurs during a step of slitting the support during manufacturing a magnetic tape and, as a result, the magnetic layer "sheds" when it is run in a VTR thus causing dropouts, although improvements in head contact, output, and reduction of output fluctuation can be attained when the glass transition temperature of the magnetic layer is increased to 100° C. or higher, as described in JP-A-2-310821 and JP-A-4-61617 (corresponding to EP 463601). If the transverse-direction Young's modulus of the nonmagnetic support is less than 1,000 kg/mm$^2$, no improving effect is produced.

Accordingly, in order to improve the mechanical properties of the whole magnetic recording medium, it is preferred that the surface void content of the magnetic layer be from 15 to 35 volume %, more preferably from 20 to 30% volume. Such a surface void content further improves the cushioning properties of the magnetic layer and prevent decrease of the packing density of ferromagnetic particles. By regulating the surface void content of the magnetic layer as described above, it has been discovered that the mechanical properties of the whole magnetic recording medium are improved and, in addition, the head contacting properties of the magnetic tape are improved.

In order to attain high output, the magnetic recording medium of the present invention is increased in the packing density of ferromagnetic particles so that the magnetic layer retains a high residual magnetic flux density. Specifically, the residual magnetic flux density ($B_r$) of magnetic recording media in accordance with the present invention is preferably at least 2,800 gauss, more preferably from 2,800 to 3,000 gauss, and most preferably 2,850 to 3,300 gauss.

It has been discovered in a preferred aspect of the present invention that when the transverse-direction (TD) Young's modulus of the nonmagnetic support is at least 1,000 Kg/mm$^2$, and the surface void content is from 15 to 35 volume % (more preferably from 20 to 30 volume %), a magnetic recording medium having improved head contacting ability is achieved. Such a magnetic recording medium may also get a high packing density of ferromagnetic particles and yet have sufficient output.

It has been discovered that by regulating the stiffness of the magnetic recording medium, in terms of the transverse-direction Young's modulus of the nonmagnetic support, and by regulating the cushioning properties of the magnetic layer, in terms of surface void content, the problem of the attraction of a magnetic recording medium toward the spacing (i.e., the aperture of the cylinder head chip) between a head core and a cylinder can be avoided and, at the same time, the magnetic layer surface comes into intimate contact with the head surface. As a result, head contact by the magnetic tape is improved and, at the same time, the packing density of ferromagnetic particles in the magnetic layer is sufficient and a high output can be obtained.

The magnetic recording media of the present invention is suitable for use with a VTR in which the shortest recording wavelength for the magnetic recording media is 1 μm or less, especially 0.8 μm or less. The magnetic recording media of the present invention is suitable for long recording times and miniaturization when used for VTR, particularly digital VTR, which employs a large-width head having a recording track width of 25 μm or less, especially 20 μm or less, and a core width of 80 μm or more, preferably 100 μm or more, and more preferably 120 μm or more. The term "core width" as used herein means the width of the sliding surface of a magnetic head measured in a direction perpendicular to the head travel direction.

The total thickness of the magnetic recording medium of the present invention is less than 12 μm, more preferably 11 μm or less. Such a small thickness is advantageous in that it ensures good head contact by the magnetic recording media and enables long-term recording.

The term "total thickness" of the magnetic recording medium as used herein means the thickness of the whole magnetic recording medium including the thickness of the nonmagnetic support, the thicknesses of the magnetic layer and the thickness of a backing layer if present.

In order to obtain a higher output from the magnetic recording media of the present invention, the residual magnetic flux density $B_r$ is preferably at least 2,800 gauss, more preferably from 2,800 to 3,500 gauss, and most preferably from 2,850 to 3,300 gauss. The surface roughness of the magnetic layer of the magnetic recording media of the present invention, in terms of center-line mean (surface) roughness $R_a$ (cut-off value: 0.25 mm), is preferably from 1.5 to 4.5 nm, more preferably from 2 to 4 nm, and most preferably from 2.5 to 3.5 nm. The ferromagnetic particles of the magnetic recording media of the present invention are preferably ferromagnetic metal particles having a specific surface area of preferably at least 47 m$^2$/g, more preferably from 50 to 70 m$^2$/g, and most preferably from 55 to 65 m$^2$/g.

It is preferred that a backing layer be provided to attain stable running of the magnetic recording media. Preferably, the backing layer has a center-line mean surface roughness ($R_a$) of from 2 to 15 nm, more preferably from 2 to 10 nm (cut-off value: 0.25 mm). The backing layer, if used, is provided on the back side of the nonmagnetic support opposite the side on which a magnetic layer has been formed.

As discussed above, the magnetic recording medium includes a nonmagnetic support and a magnetic layer formed thereon, and may further include a backing layer if desired formed on the side opposite to the magnetic layer. The magnetic layer may include one or more powdery ingredients, i.e., ferromagnetic particles and optional ingredients such as carbon black, an abrasive, and a powdery lubricant, and a binder in which the powdery ingredients are dispersed. The binder may include a resinous ingredient and a hardener, if desired.

The magnetic layer of the magnetic recording media of the present invention can have the desired glass transition temperature by virtue of: the glass transition temperature of a resin used as the binder for the magnetic layer; the amount of the resin; the amount of an optional hardener for the magnetic layer; the degree of crosslinking by the hardener; and the amount of a lubricant or the like which has a plasticizing effect on the binder for the magnetic layer. The glass transition temperature of a magnetic layer can be determined from the temperature at which the magnetic layer has a peak loss modulus as determined by an automatic dynamic viscoelasticity tester (manufactured by Orientec K.K., Japan) at a frequency of 110 Hz at a temperature of 30° to 120° C. and a heating rate of 2° C./min.

In the present invention, the glass transition temperature of the magnetic layer of the magnetic recording media is 80° to 100° C., preferably 85° to 95° C.

Preferably, the surface void content of the magnetic layer of the magnetic recording media in the present invention is within the above-specified range by virtue of the amount of a binder resin and additives present in the magnetic layer. However, it can be most efficiently regulated by controlling the manner and conditions of calendering conducted after formation of the magnetic layer on a nonmagnetic support by coating.

A preferred device for the calendering is a calender having at least pair of metal rolls arranged in parallel. For example, a supercalender or the like.

Although the metal-metal calender may include one or more pairs of metal rolls, preferably the metal-metal calender includes metal rolls arranged in a three-stage stack. The devices having plurality of pairs of rolls having different characteristics may be used in combination. Examples of suitable material for the metal rolls include carbon steel and chromium-molybdenum steel. Preferably, the surface Shore hardness thereof is 50° to 95°, preferably from 60° to 90°. Preferably, the center-line mean surface roughness ($R_a$) of the roll surfaces is 1 to 10 nm, more preferably from 1 to 5 nm, at a cut-off value of 0.25 mm.

A preferred calender has a three-roll construction including upper and lower flat rolls and a middle crown roll.

Calendering conditions preferably include a temperature of preferably 40° to 120° C., more preferably from 60° to 90° C., a linear pressure of preferably from 40° to 200 Kg/cm, more preferably from 50 to 150 Kg/cm, and a calendering speed of preferably from 40 to 300 m/min, more preferably from 50 to 250 m/min, and most preferably from 60 to 200 m/min. The number of times the magnetic tape passes through the rolls is generally at least 2 in total, preferably from 4 to 8 in total.

A surface void content in the range specified above can be achieved by the above-described calendering. At the same time, the voids formed by removal of solvent during drying can be reduced which allows for higher packing density of ferromagnetic particles in the magnetic layer. Hence, a magnetic recording medium having high electromagnetic characteristics can be provided.

If ordinary elastic rolls for calendering, such as cotton, nylon, or epoxy resin rolls are used for the calendering in accordance with the present invention, a high surface void content can be achieved and a magnetic recording media with good head contacting properties can be obtained. However, these rolls are undesirable because when the calendering pressure is increased, the shape of the contact region where the roll contacts the work is a flat plane and the area in which the roll is in contact with the magnetic layer surface is increased, so that the effective pressure decreases, resulting in low packing density of ferromagnetic particles in the magnetic layer and making it difficult to produce a magnetic recording medium having high output.

In contrast, when calendering between metal rolls, there is almost no roll deformation of the kind which enlarges the roll area in contact with the magnetic layer surface. Hence, by selecting adequate temperature and pressure conditions as described above, the packing density of ferromagnetic particles can be increased while maintaining a high surface void content in the magnetic layer. In conventional calendering by metal roll-metal roll calendering, it has been impossible to conduct pressing at a uniform pressure over the roll width because the degree of bending of the rolls changes as the pressure applied to the rolls is changed. However, as mentioned above, a three-roll calender having a middle crown roll which has a variable crown shape enables application of a pressure which is always uniform over the roll width. Use of such a three-roll calender, therefore, is particularly preferred in that a pressure as described above which attains both the desired surface void content and the desired packing density of ferromagnetic particles can be achieved. If a three-roll calender is used which does not include a crown roll having a variable crown shape is employed in place of the above-described crown roll, the proper control of surface void content is difficult although a high packing density of ferromagnetic particles can be attained.

The surface void content of the magnetic layer can be calculated from the total void volume measured with Autosorb based on $N_2$ gas adsorption at a liquid nitrogen temperature. In this method, the surface void content is calculated from an adsorption curve obtained by adsorbing nitrogen to saturation and from a desorption curve obtained by gradually reducing the partial nitrogen pressure from the value corresponding to the saturation adsorption.

The nonmagnetic support suitable for use in the present invention preferably has a thickness of from about 5 to 10 $\mu$m, more preferably from about 6 to 9 $\mu$m, and a transverse-direction Young's modulus of at least 1,000 Kg/mm$^2$, preferably at least 1,200 Kg/mm$^2$. The longitudinal-direction Young's modulus thereof is in the range of from 400 to 1,200 Kg/mm$^2$, preferably from 450 to 1,000 Kg/mm$^2$.

Suitable materials for the nonmagnetic support include: polyesters, such as poly(ethylene terephthalate) and poly(ethylene naphthalate); polyolefins, such as polypropylene; cellulose derivatives, such as cellulose triacetate and cellulose diacetate; vinyl resins, such as poly(vinyl chloride); and plastics, such as polycarbonates, polyimides, polyamides, and polysulfones. Of the foregoing, poly(ethylene terephthalate), poly(ethylene naphthalate), polyamides, and polyimides are preferred, and more preferred is poly(ethylene naphthalate) (PEN). The support may be treated by corona discharge treatment, plasma treatment, undercoating treatment, heat treatment, dust-removing treatment, metal deposition treatment or alkali treatment prior to coating. Suitable supports are described in, for example, West German Patent 3,338,854A, JP-A-59-116926, U.S. Pat. No. 4,388,368, the disclosure of which is herein incorporated by reference, and Yukio Mitsuishi, Sen'i to Kogyo (Fibers and Industry), Vol.31, pp. 50–55, 1975. Preferably, the center-line mean surface roughnesses of the support is 0.001 to 0.5 $\mu$m (cut-off value: 0.25 mm).

The poly(ethylene naphthalate) suitable for use in the present invention includes ethylene-2,6-naphthalenedicarboxylate homopolymer, copolymers containing at least 70% by weight of ethylene-2,6-naphthalenedicarboxylate repeating units, and polyester compositions substantially having the properties of poly(ethylene naphthalate), such as mixtures of the above-mentioned polymers with other polymers (provided that the poly(ethylene naphthalate) content is 70% by weight or higher). The poly(ethylene naphthalate) has film-forming ability.

Suitable poly(ethylene naphthalate) film for use in the present invention can be produced by biaxially orienting an unstretched film. The biaxial orientation may be carried out, for example, by successive biaxial orientation, in which first-stage stretching is conducted at a temperature higher than the glass transition temperature of the poly(ethylene naphthalate), preferably at from 3° to 10° C., followed by second-stage stretching which is conducted at a temperature which is the same temperature as for the first-stage stretching or up to 10° C. Preferably, the stretch ratio for at least one of the two directions is at least 2, preferably at least 2.5, and the areal expansion ratio is at least 6, preferably at least 8. Preferably, heat treatment (heat set) is conducted at a temperature of at least 170° C., preferably at least 190° C., while the film is maintained under tension. Although the maximum temperature for the heat treatment is, of course, dependent on treating duration, a temperature is preferred at which the film retains a stable shape. The time for heat treatment, preferably from several seconds to several tens of seconds, more preferably from 3 to 30 seconds. Preferably, the above treatment is followed by successive stretching during which the film is further stretched at a ratio of 1.05 to 2.5 in a longitudinal-direction and at a ratio of from 1.05 to 2.5 in a transverse-direction. The successive stretching is carried out at a temperature which is between a temperature 10° C. lower than the glass transition temperature of the support to a temperature 40° C. lower than the melting temperature of the support. The support may then be reheated at a temperature which is between a temperature 50° C. lower than the glass transition temperature of the support to a temperature 10° C. lower than the melting temperature of the support.

Ferromagnetic particles which are suitable for use in the present invention may be ferromagnetic metal particles containing iron, cobalt, or nickel. Such ferromagnetic metal particles is particularly effective in enhancing the effects of the present invention. Preferred ferromagnetic particles include fine particles of ferromagnetic metals such as $\alpha$-Fe, Co, Ni, Fe-Co alloys, Fe-Co-Ni alloys, Fe-Co-Ni-P alloys, Fe-Co-Ni-B alloys, Fe-Ni-Zn alloys, Ni-Co alloys and Co-Ni-Fe alloys.

Other suitable ferromagnetic particles will be apparent to one skilled in the art.

The ferromagnetic metal particles may have any suitable shape, and particles which are acicular shaped, granular shaped, cubical shaped, ellipsoidal-grain shaped, platy shaped or the like may be employed.

With regard to particle sizes, in the case of acicular particles, the long axis length is preferably from 0.05 to 0.5 μm, more preferably from 0.05 to 0.3 μm, and most preferably from 0.10 to 0.25 μm, with the long axis length/short axis length ratio being preferably from 2/1 to 25/1, more preferably from 3/1 to 15/1, and most preferably from 4/1 to 12/1. In the case of tabular particles, the tabular diameter is preferably from 0.02 to 0.20 μm, more preferably from 0.03 to 0.10 μm, and most preferably from 0.04 to 0.07 μm, with the tabular diameter/tabular thickness ratio being preferably from 1/1 to 30/1, more preferably from 2/1 to 10/1, and most preferably from 2.5 to 7/1.

The specific surface area (SBET) of the ferromagnetic metal particles is preferably from 47 to 80 m$^2$/g, more preferably from 53 to 70 m$^2$/g, the coercive force (Hc) thereof is preferably from 1,250 to 2,500 Oe, and the saturation magnetization ($\sigma_s$) thereof is preferably from 100 to 180 emu/g, more preferably from 110 to 150 emu/g. The water content thereof is preferably from 0.1 to 2.0% by weight and the pH thereof is preferably from 3 to 11 (5 g-ferromagnetic particles/100 g-water). Before the ferromagnetic metal particles are dispersed, an anticorrosive agent, surface-treating agent, dispersant, lubricant, or antistatic agent, which will be described later, or other agents may be adsorbed onto the surfaces of the particles by impregnating the particles with these agents in a solvent.

The ferromagnetic metal particles may, for example, include ferromagnetic particles which contain at least 60% by weight of a metallic component where at least 70% by weight of the metallic component or components is particles of one or more kinds of ferromagnetic metal or alloy (e.g., Fe, Fe-Co, Fe-Co-Ni, Co, Ni, Fe-Ni, Co-Ni, or Co-Ni-Fe). Up to 40% by weight, more preferably up to 20% by weight, of the metallic components or components is either an alloy which may contain other elements (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P) or iron nitride, iron carbide, etc. If metallic iron is used, it is preferred that a layer of Al, Si, Cr or a mixture thereof be formed on the particle surfaces in order to reinforce the particles. The ferromagnetic metal particles may contain a small amount of a hydroxide, oxide, alkali metal element (e.g., Na or K), alkaline earth metal element (e.g., Mg, Ca, or Sr), or the like. Processes for producing ferromagnetic metal particles which are suitable for use in the present invention are known.

Suitable processes for producing ferromagnetic alloy particles that may be used in the present invention include the following:

(a) Reduction with a composite organic acid double salt (mainly an oxalate) and a reducing gas such as hydrogen;

(b) Reducing iron oxide with a reducing gas such as hydrogen to obtain Fe or Fe-Co particles or the like;

(c) Thermal deposition of a metal carbonyl compound;

(d) Reduction conducted by adding a reducing agent such as sodium boronhydride, a hypophosphite, or hydrazine to an aqueous solution of a ferromagnetic metal;

(e) Separation ferromagnetic metal particles from the mercury after ferromagnetic metal particles are electrolytically precipitated using a mercury cathode; and (f) Vaporizing a metal in a low-pressure inert gas to obtain fine particles.

Tabular hexagonal barium ferrite is suitable for use as the ferromagnetic particles. The particle size of the barium ferrite is preferably about from 0.001 to 1 μm in diameter, with the thickness being from 1/2 to 1/20 of the diameter. The specific gravity of the barium ferrite is preferably from 4 to 6 g/ml and the specific surface area thereof is preferably from 1 to 70 m$^2$/g.

The magnetic layer may include $FeO_x$ (x=1.33-1.50), Co-containing $FeO_x$, or the like.

The resinous component of the binder of the magnetic layer and backing layer in the present invention may be any suitable thermoplastic resin, thermosetting resin, reactive resin, electron beam-curable resin, ultraviolet-curable resin, or visible light-curable resin, or a mixture thereof.

The thermoplastic resin may have a softening temperature of 150° C. or less, a number-average molecular weight of from 10,000 to 300,000, and a polymerization degree of about from 50 to 2,000, more preferably about from 200 to 600. Examples of suitable thermoplastic resins include vinyl chloride-vinyl acetate copolymers, poly(vinyl chloride), vinyl chloride-vinyl acetate-vinyl alcohol copolymers, vinyl chloride-vinylidene chloride copolymers, vinyl chloride-acrylonitrile copolymers, acrylic acid ester-acrylonitrile copolymers, acrylic acid estervinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, poly(vinyl fluoride), vinylidene chloride-acrylonitrile copolymers, butadiene-acrylonitrile copolymers, polyamide resins, poly(-vinyl butyral), cellulose derivatives (e.g., cellulose acetate butyrate, cellulose diacetate, cellulose triacetate, cellulose propionate, nitrocetlulose, ethyl cellulose, methyl cellulose, propyl cellulose, methyl ethyl cellulose, carboxymethyl cellulose, and acetyl cellulose), styrene-butadiene copolymers, polyester resins, polycarbonate resins, chlorovinyl ether-acrylic acid ester copolymers, amino resins, thermoplastic resins of any suitable synthetic rubber type, and mixtures thereof.

The thermosetting and reactive resin may have a molecular weight of 200,000 or less as a coating solution but to infinity through condensation, addition, or other reaction which may take place when the coating solution is exposed to heat or moisture after being applied and dried. Preferred thermosetting and reactive resins do not soften or melt before undergoing thermal decomposition. Examples of such resins include phenolic resins, phenoxy resins, epoxy resins, polyurethane resins, polyester resins, polyurethane polycarbonate resins, urea resins, melamine resins, alkyd resins, silicone resins, reactive acrylic resins (electron beam-curable resins), epoxy-polyamide resins, nitrocellulose-melamine resins, mixtures of high-molecular polyester resin and isocyanate prepolymer, mixtures of methacrylate copolymer and diisocyanate prepolymer, mixtures of polyester polyol and polyisocyanate, urea formaldehyde resins, low molecular weight glycol/high molecular weight diol/triphenylmethane triisocyanate mixtures, polyamine resins, polyimine resins, and mixtures thereof.

Preferably, the thermoplastic, thermosetting, and reactive resins may contain one to six functional groups including: acidic groups, such as groups derived from carboxylic acids (COOH), sulfinic acids, sulfenic acids, sulfonic acids ($SO_3M$), phosphoric acid (PO(OM)(OM)), phosphonic acid, sulfuric acid ($OSO_3M$), and esters thereof (where M is H, an alkali metal, an alkaline earth metal, or a hydrocarbon group); amphoteric groups, such as groups derived from amino acids, aminosulfonic acids, sulfuric or phosphoric esters with amino alcohols, and alkylbetaines; an amino group, imino group, imido group, amido group, and the like; and other groups including a hydroxyl group, alkoxyl groups, a thiol group, alkylthio groups, halogens (F, Cl, Br, and I), a silyl group, a siloxane group, an epoxy group, an isocyanato group, a cyano group, a nitryl group, an oxo group, an acryloyl group, and a phosphinic group. The content of each functional group is preferably from $1 \times 10^{-6}$ to $1 \times 10^{-2}$ eq/g-resin.

A polyisocyanate compound may be used as a hardener.

Examples of suitable polyisocyanate compounds for use in the magnetic layer and/or the backing layer in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, triphenylmethane triisocyanate, and isophorone diisocyanate, products of the reactions of the above-mentioned isocyanates with polyalcohols, dimer to decamer isocyanates formed through condensation of isocyanates, and products of the reactions of triisocyanates with polyurethanes which products have an isocyanate as a terminal functional group. The average molecular weight of these polyisocyanates is preferably from 100 to 20,000. Suitable polyisocyanate compounds which may be used in the present invention are commercially available under the trade names of: Coronate L, Coronate HL, Coronate 2030, Coronate 2031, Millionate MR, and Millionate MTL (manufactured by Nippon Polyurethane Co., Ltd., Japan); Takenate D-102, Takenate D-110N, Takenate D-200, Takenate D-202, Takenate 300S, and Takenate 500 (manufactured by Takeda Chemical Industries, Ltd., Japan); and Sumidur T-80, Sumidur 44S, Sumidur PF, Sumidur L, Sumidur N, Desmodur L, Desmodur IL, Desmodur N, Desmodur HL, Desmodur T-65, Desmodur 15, Desmodur R, Desmodur RF, Desmodur SL, and Desmodur Z4273 (manufactured by Sumitomo Bayer Co., Ltd., Japan). The polyisocyanate may be used alone, or in combinations of two or more in order to take advantage of a difference in curing reactivity. In order to accelerate curing, a polyisocyanate may be used in combination with a hydroxyl group-containing compound (e.g., butanediol, hexanediol, a polyurethane having a molecular weight of from 1,000 to 10,000, or water), an amino group-containing compound (e.g., monomethylamine, dimethylamine, or trimethylamine), or a catalyst, e.g., a metal oxide or acetylacetonatoiron. These hydroxyl or amino compounds preferably are polyfunctional. Preferably, the polyisocyanates are preferably used in an amount of from 2 to 70 parts by weight, more preferably from 5 to 50 parts by weight, per 100 parts by weight of the sum of the binder resin and the polyisocyanate, for each of the magnetic layer and the backing layer. Examples of suitable polyisocyanates are described in, e.g., JP-A-60-131622 and JP-A-61-74138.

The binder may be used alone or in combination with additives. The proportion of ferromagnetic particles to binder in the magnetic layer is such that the binder amount is from 5 to 300 parts by weight per 100 parts by weight of the ferromagnetic particles. In the backing layer, the proportion of particles to binder is such that the binder amount is from 8 to 400 parts by weight per 100 parts by weight of the particles. Examples of additives include a carbon black, an abrasive, a lubricant, a dispersant/dispersant aid, a mildew-proofing agent, an antistatic agent, an antioxidant, and a solvent.

Examples of carbon blacks that can be used in the magnetic layer and backing layer in the present invention include furnace black which is used for rubbers, thermal black which is also used for rubbers, coloring black, and acetylene black. These carbon blacks may be used as an antistatic agent in the tape, to serve as a light screen and to regulate a friction coefficient for the tape, and to improve the durability of the tape.

Carbon blacks which are suitably for use in the present invention have the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF, and RCF. Carbon blacks included in ASTM D-1765-82a are suitable for use in the present invention. Preferably, the carbon black has an average particle size of from 5 to 1,000 nm (as determined by an electron microscope), a specific surface area as measured by nitrogen adsorption method of from 1 to 800 $m^2/g$, a pH of from 4 to 11 (JIS K-6221, 1982), and an oil absorption as measured with dibutyl phthalate (DBP) of from 10 to 800 mL (milliliter) per 100 g (JIS K-6221, 1982). Carbon blacks of the following particle sizes can be used in the present invention. A carbon black having a particle size of from 5 to 100 nm is suitable to reduce the surface electrical resistance of a coating film, while a carbon black having a particle size of from 50 to 1,000 nm is suitable to control the strength of a coating film. Further, a fine carbon black (less than 100 nm) is suitable to control the surface roughness of a coating film and to attain surface smoothness in order to reduce spacing loss, while a coarse carbon black (100 nm or more) is suitable to roughen the surface of a coating film to decrease its coefficient of friction. Thus, carbon blacks of different sizes and amounts may be used in the magnetic recording medium.

These carbon blacks may be surface-treated with a dispersant which will be described later or with another agent or may be grafted with a resin, before use. A carbon black whose surfaces have been partly graphitized may be used in the present invention. The carbon black may be treated at a temperature of at least 2,000° C. in a furnace in which the carbon black is being produced in order to partially graphitize the carbon black. Moreover, a hollow carbon black can be used in the present invention.

Preferably, the carbon blacks are used in the magnetic layer in an amount of 0.1 to 30 parts by weight per 100 parts by weight of the ferromagnetic particles. In the backing layer, the carbon black amount is preferably from 20 to 400 parts by weight per 100 parts by weight of the resin. With respect to carbon blacks suitably for use in the present invention, reference may be made, for example, to *Carbon Black Binran* (*Carbon Black Handbook*), edited by Carbon Black Association, Japan (published in 1971). Examples of suitable carbon blacks are given in, e.g., U.S. Pat. Nos. 4,539,257 and 4,614,685, the disclosures of which are herein incorporated by reference, JP-A-61-92424, and JP-A-61-99927.

An abrasive may be used in the magnetic layer and the backing layer in order to improve the durability of the magnetic recording medium and enhance cleaning of a VTR head. Any suitable material having an abrading or scratching action may be used. Examples thereof include α-alumina, γ-alumina, α,γ-alumina, molten alumina, silicon carbide, chromium oxide, cerium oxide, corundum, artificial diamond, α-iron oxide, garnets, emery (main ingredients: corundum and magnetite), silica, silicon nitride, boron nitride, molybdenum carbide, boron carbide, tungsten carbide, titanium carbide, quartz, tripoli, diatomaceous earth, and dolomite. The abrasives, which mostly have a Mohs' hardnesses of at least 6, more preferably at least 8, may be used alone or in combinations of two to four thereof. The average particle sizes of these abrasives are preferably from 0.005 to 5 μm, more preferably from 0.01 to 2 μm. The abrasives may be incorporated in the magnetic layer in an amount of from 0.01 to 20 parts by weight per 100 parts by weight of the ferromagnetic particles. In the backing layer, the abrasive is preferably present in an amount of from 0.01 to 5 parts by weight per 100 parts by weight of the resin, which will be described below. Examples of suitable abrasives include AKP1, AKP15, AKP20, AKP30, AKP50, AKP80, Hit50, and Hit100 manufactured by Sumitomo Chemical Co., Ltd., Japan. These are described in, e.g., JP-B-52-28642.

Examples of powdery lubricants that can be used in the magnetic layer and backing layer in the present invention include fine powders of inorganic substances such as graphite, molybdenum disulfide, boron nitride, graphite fluoride, calcium carbonate, barium sulfate, silicon oxide, titanium oxide, zinc oxide, tin oxide, and tungsten disulfide and fine powders of resins such as an acrylic-styrene resin, benzoguanamine resin, melamine resin, polyolefin resin, polyester resin, polyamide resin, polyimide resin, and poly(ethylene fluoride) resin.

Examples of organic compound lubricants which are suitable for use in the present invention include: fluorine or silicon compounds such as silicone oils (e.g., dialkylpolysiloxanes, dialkoxypolysiloxanes, phenylpolysiloxane, and fluoroalkylpolysiloxanes (e.g., KF96 and KF69 manufactured by Shin-Etsu Chemical Co., Ltd., Japan)), fatty acid-modified silicone oils, fluoroalcohols, polyolefins (e.g., polyethylene wax and polypropylene), polyglycols (e.g., polyethylene glycol and poly(ethylene oxide) wax), polytetrafluoroethylene oxide wax, poly(tetrafluoroethylene glycol), perfluoroalkyl ethers, perfluorofatty acids, perfluorofatty acid esters, perfluoroalkylsulfuric acid esters, perfluoroalkylsulfonic acid esters, perfluoroalkylbenzenesulfonic acid esters, and perfluoroalkylphosphoric acid esters; organic acids and organic acid ester compounds such as alkylsulfuric esters, alkylsulfonic acid esters, alkylphosphonic acid triesters, alkylphosphonic acid monoesters, alkylphosphonic acid diesters, alkylphosphoric acid esters, and succinic acid esters; heterocyclic compounds containing nitrogen or sulfur such as triazaindolizine, tetraazaindene, benzotriazole, benzodiazole, and EDTA; fatty acid esters including a monobasic fatty acid having 10 to 40 carbon atoms and one or more of mono-, di-, tri-, tetra-, and hexahydric alcohols having 2 to 40 carbon atoms; fatty acid esters including a monobasic fatty acid having at least 10 carbon atoms and a mono- to hexahydric alcohol having carbon atoms in such a number that the sum of the carbon atoms in the alcohol and those in the acid is from 11 to 70; and fatty acids, fatty acid amides, fatty acid alkylamides, and aliphatic alcohols each having 8 to 40 carbon atoms.

Examples of suitable organic compound lubricants include butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmirate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkylamides, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. These compounds can be used alone or in combination.

So-called "lubricating-oil additives" can be used as a lubricant in the present invention either alone or in combination. Examples thereof include antioxidants known as rust preventing agents (e.g., alkylphenols, benzotriazine, tetraazaindene, sulfamides, guanidiene, nucleic acids, pyridine, amines, hydroquinone, and metallic chelating agents such as EDTA), rust preventing agents (e.g., naphthenic acid, alkenylsuccinic acids, phosphoric acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and anti-foaming agents. These lubricants are preferably included in the magnetic recording media of the present invention in an amount of from 0.01 to 30 parts by weight per 100 parts by weight of the binder.

Examples of suitable dispersants and dispersant aids which may be used in the magnetic recording media of the present invention include fatty acids having 2 to 40 carbon atoms, which can be represented by the formula $R_1COOH$, wherein $R_1$ is an alkyl group having 1 to 39 carbon atoms, a phenyl group, or an aralkyl group, such as caprylic acid, captic acid, lauric acid, myristic acid, palmitic acid, stearic acid, oleic acid, elaidic acid, linoleic acid, linolenic acid, stearolic acid, behenic acid, maleic acid, and phthalic acid; metallic soaps (e.g., copper oleate) including the above-enumerated fatty acids and alkali metals (e.g., Li, Na, and K), alkaline earth metals (e.g., Mg, Ca, and Ba), $NH_4^+$, Cu, Pb, etc.; fatty acid amides derived from the above mentioned fatty acids; and lecithins (soybean oil lecithin). Also usable as a dispersant or dispersant aid in the present invention are higher alcohols having 4 to 40 carbon atoms (e.g., butanol, octyl alcohol, myristyl alcohol, and stearyl alcohol) and sulfuric acid esters thereof, sulfonic acids, phenylsulfonic acids, alkylsulfonic acids, sulfonic acid esters, monoesters of phosphoric acid, diesters of phosphoric acid, triesters of phosphoric acid, alkylphosphonic acids, phenylphosphonic acids, amine compounds, and the like. Polyethylene glycol, poly(ethylene oxide), sulfosuccinic acid, metal salts of sulfosuccinic acid, sulfosuccinic esters, and the like are also suitable for use as a dispersant or dispersant aid. The dispersants may be used alone or in combinations of two or more, with the amount of each dispersant being from 0.005 to 20 parts by weight per 100 parts by weight of the binder. The dispersants may be adhered onto the surfaces of ferromagnetic particles or nonmagnetic particles prior to forming the magnetic layer or they may be added during dispersion of the ferromagnetic particles or nonmagnetic particles. Suitable methods for incorporating the dispersant into the magnetic layer are described in, e.g, JP-B-39-28369, JP-B-44-17945, JP-B-48-15001, and U.S. Pat. Nos. 3,387,993 and 3,470,021 the disclosures of which are herein incorporated by reference.

Examples of suitable mildew-proofing agents for use in the present invention include 2-(4-thiazolyl)benzimidazole, N-(fluorodichloromethylthio)phthalimide, 10,10'-oxybisphenoxysalicin, 2,4,5,6-tetrachloroisophthalonitrile, p-tolyl diiodomethyl sulfone, triiodoallyl alcohol, dihydroacetic acid, mercury phenyloleate, bis(tributyltin) oxide, and salicylanilide.

Suitable mildew-proofing agents are described in, e.g., *Biseibutsu Saigai to Boshi Gijutsu* (*Microbial Damages and Preventive Techniques*), published by Kogaku Tosho, Japan, 1972 and *Kagaku to Kogyo* (*Chemistry and Industry*), 32, 904 (1979).

Suitable antistatic agents, other than carbon black which was discussed above, which may be used in the present invention include conductive powders, such as graphite, modified graphites, carbon black graft polymers, tin oxide-antimony oxide, tin oxide, and titanium oxide-tin oxide-antimony oxide; natural surfactants, such as saponin; nonionic surfactants, such as alkylene oxide type nonionic surfactants, glycerin type nonionic surfactants, or glycidol type nonionic surfactants, polyhydric alcohols, esters of polyhydric alcohols, and ethylene oxide adducts of alkylphenols; cationic surfactants, such as higher alkylamines, cyclic amines, hydantoin derivatives, amidoamines, ester-amides, quaternary ammonium salts, pyridine and other heterocyclic compounds, and phosphonium or sulfonium compounds; anionic surfactants containing an acidic radical, such as a carboxylic, sulfonic, phosphonic, or phosphoric acid radical or a sulfate, phosphonate, or phosphate radical; and amphoteric surfactants, such as amino acids, aminosulfonic acids, sulfuric or phosphoric esters of amino alcohols, and alkylbetaines. The surfactants may be used either alone or as a mixture thereof. In the magnetic recording medium, the surfactants are preferably used in an amount of from 0.01 to 10 parts by weight per 100 parts by weight of the ferromagnetic particles. For the backing layer, the surfactants are preferably used in an amount of from 0.01 to 30 parts by weight per 100 parts by weight of the binder. Although the above-mentioned surfactants are used as antistatic agents, they may be used for other purpose, e.g., in order to improve dispersibility, magnetic properties, or lubricating properties or as a coating aid, moistening agent, curing accelerator, or dispersion accelerator.

The magnetic layer can be formed according to any suitable method. For example, a method can be utilized in which magnetic layer-forming ingredients, including ferromagnetic particles and resinous ingredients, as described above, and optional ingredients, such as an abrasive and a hardener, are dispersed by kneading these ingredients with a solvent to prepare a magnetic coating solution which is applied on a nonmagnetic support.

Any suitable organic solvent may be used in the steps of dispersion, kneading, and coating for producing the magnetic recording medium of the present invention. Examples of suitable solvents include: ketone-type solvents, such as acetone, methyl ethyl ketone, methyl isobutyl ketone, cyclohexanone, isophorone, and tetrahydrofuran; alcohol-type solvents, such as methanol, ethanol, propanol, butanol, isobutyl alcohol, isopropyl alcohol, and methylcyclohexanol; ester-type solvents, such as methyl acetate, ethyl acetate, butyl acetate, isobutyl acetate, isopropyl acetate, ethyl lactate, and glycol acetate monoethyl ethers; ether-type solvents, such as diethyl ether, tetrahydrofuran, glycol dimethyl ethers, glycol monoethyl ethers, and dioxane; tar-type (aromatic hydrocarbon) solvents, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; and other compounds such as N,N-dimethylformamide and hexane. The solvents may be used in combinations of two or more in any suitable proportion. The solvents may contain a slight amount, i.e., up to 1% by weight, of impurities (e.g., polymers of the solvents themselves, water, and raw materials). The amount of solvents used in the present invention is preferably 100 to 20,000 parts by weight per 100 parts by weight of the total solid ingredients, in each of the magnetic layer-forming coating solution, backing layer-forming coating solution, and undercoating solution. Preferably, the solids content of the magnetic layer-forming coating solution is 10 to 40% by weight, and the solids content of the backing layer-forming coating solution is 5 to 20% by weight. A hydrophilic medium (e.g., water, an alcohol, or acetone) can be used in the present invention in place of the organic solvents discussed above.

Any suitable dispersing and kneading method may be used in the present invention, and the sequence of the addition of ingredients (resins, powders, lubricants, solvents, etc.), the position where each ingredient is added during dispersion/kneading, the dispersion temperature (0°–80° C.), and other conditions will be apparent to one skilled in the art. An ordinary kneading machine may be used for preparing the coating solution for forming the magnetic layer and for preparing the coating solution for forming the backing layer. Examples of suitable kneading machines include a two-roll mill, a three-roll mill, a ball mill, a pebble mill, a tron mill, a sand grinder, a Szegvari, an attritor, a high-speed impeller, a dispersing machine, a high-speed stone mill, a high-speed impact mill, a disper, a kneader, a high-speed mixer, a ribbon blender, a co-kneader, an intensive mixer, a tumbler, a blender, a disperser, a homogenizer, a single axial screw extruder, a biaxial screw extruder, and an ultrasonic wave dispersing machine. The dispersion/kneading treatment may be performed continuously by using two or more dispersing/kneading machines. Details of suitable kneading and dispersing techniques are described in *Paint Flow and Pigment Dispersion*, written by T. C. Patton, published by John Wiley & Sons in 1964; *Kogyo Zairyo* (*Industrial Materials*), Vol. 25, 37 (1977), written by Shin-ichi Tanaka; and references cited in these books. Steel balls, steel beads, ceramic beads, glass beads, or organic polymer beads each having a diameter of from 10 cm to 0.05 mm in terms of sphere diameter can be used as a material for dispersion/kneading. The auxiliary materials may be any suitable shape. Suitable kneading and dispersion techniques which may be used in the present invention are described in, e.g., U.S. Pat. Nos. 2,581,414 and 2,855,156, the disclosures of which are herein incorporated by reference. Kneading and dispersion can also be performed in the present invention according to any of the methods described in the above-mentioned books and references cited therein in order to prepare the magnetic coating solution and a coating solution for forming the backing layer.

The above-described magnetic coating solution and backing layer-forming coating solution are applied on a support after the viscosities of the coating solutions are adjusted to from 1 to 20,000 cSt, as measured at 25° C. Examples of suitable coating techniques include air doctor coating, blade coating, air knife coating, squeeze coating, impregnation coating, reverse roll coating, transfer roll coating, gravure coating, kiss coating, cast coating, spray coating, rod coating, normal-rotation roll coating, curtain coating, bar coating, extrusion coating, and spin coating. Other coating techniques will be apparent to one skilled in the art. Suitable coating techniques are described in detail in *Coating Kogyo* (*Coating Industry*), pp. 253–277, published by Asakura Shoten, Japan in Mar. 20, 1971.

The coating solutions can be applied in any suitable order. Prior to the application of any desired coating solution, an undercoating layer may be formed or corona discharge treatment or the like may be conducted in order to improve adhesion of the coating solution to the support. If a multilayer magnetic or backing layer is desired, simultaneous multiple coating, successive multiple coating, or the like may be conducted. Suitable methods for forming are described in, e.g., JP-A-57-123532 and JP-B-62-37451.

If desired, the magnetic layer coating solution, which may be applied on a support to a thickness of about 1 to 200 μm, is immediately subjected to a magnetic orienting treatment for orienting the ferromagnetic particles in the coating layer to a desired direction (e.g., perpendicular, longitudinal, transverse, random, or oblique direction) at about 500 to 5,000 G. This may be carried out while the coating layer is stepwise dried at temperatures of 20° to 130° C. Thereafter, the magnetic layer formed is dried to give a thickness of from 0.1 to 30 μm. The traveling speed of the support during the drying is preferably 10 to 900 m/min, and two or more drying zones are preferably used and regulated to have drying temperatures of from 20° to 130° C., so as to result in a residual solvent content of the coating film of from 0.1 to 40 mg/m$^2$.

After drying, the magnetic and back coating layers may be calendered if desired, to thereby regulate the center-line mean surface roughness of the magnetic and backing layer preferably to a value within the range discussed above. A supercalender or the like, for example, is preferably utilized for calendering. Due to the calendering, voids formed by the removal of solvent during drying are reduced and the packing density of ferromagnetic particles in the magnetic layer are improved, so that a magnetic recording medium having good electromagnetic characteristics can be obtained.

If a hardener is used in the binder, preferably at least 90% by weight of the hardener contained in the magnetic layer remains unreacted after the above-described calendering. Preferably, curing treatment is conducted to react at least 50% by weight, more preferably at least 80% by weight, of the hardener, before subsequent treatment is performed. Suitable curing methods include heat curing and electron beam curing, either of which can be utilized in the present invention. The unreacted hardener contained in the calendered magnetic layer reacts due to curing with resinous ingredients, e.g., vinyl chloride copolymer and polyurethane resin, so as to form a three-dimensional crosslinked structure. Any suitable heat treatment may be employed in the present invention. For example, the heat treatment is preferably conducted at a temperature of at least 40° C., more preferably 50 to 80° C., over a period of preferably at least 20 hours, more preferably from 24 hours to 7 days. Also, curing may be conducted by conventional electron beam irradiation curing.

The magnetic recording medium produced as described above is slit into a desired shape using any suitable slitting machine, e.g., a slitter, or other device under ordinary conditions and is then wound on a plastic or metal reel.

The thus-produced magnetic recording medium of the present invention may be subjected to burnishing treatment with a polishing tape just before the winding or during a step conducted before the winding to burnish the magnetic layer surface alone or both the magnetic layer surface and the backing layer surface, in addition to the edges and base surface of the medium. Such a burnishing treatment is disclosed in, e.g., JP-A-63-259830.

A wiping treatment of the magnetic recording medium is preferably conducted by wiping the magnetic layer surface, backing layer surface, edges, or back-side surface of the base with a nonwoven fabric or other material, in order to remove any fouling substance present on the magnetic recording medium surface and any excess lubricant. As such a wiping material, various kinds of Vilene (manufactured by Japan Vilene Co., Ltd.), Toraysee and Ecsaine (manufactured by Toray Industries, Inc.), Kuraray WRP series (manufactured by Kuraray Co., Ltd.), and nonwoven fabrics, such as nonwoven nylon fabrics, nonwoven polyester fabrics, nonwoven rayon fabrics, nonwoven acrylonitrile fabrics, and nonwoven mixed-fiber fabrics, may also be used in the invention. Besides these, tissue paper, Kimwipe, and the like are also usable. These materials are described in, e.g., JP-A-1-201824. Particles adherent on the magnetic layer and/or backing layer and organic substances present thereon are completely removed by this wiping treatment and dropouts and head clogging is reduced.

Preferably, the steps of pretreatment/surface treatment of powders, kneading/dispersion, coating/orientation/drying, calendering, curing (heat treatment, radiation (electron beam) treatment), slitting, burnishing treatment, wiping treatment, and winding are carried out successively. A suitable method is described in JP-B-41-13181. The order of these treatments may be varied.

With respect to the ferromagnetic or nonmagnetic particles, binders, additives (lubricant, dispersant, antistatic agent, surface-treating agent, carbon black, abrasive, light screen, antioxidant, mildew-proofing agent, etc.), solvents, and supports (which may have an undercoating layer, backing layer, or back undercoating layer) which can be used in the present invention or to processes for producing the magnetic recording medium, reference can be made to those described in, e.g., JP-B-56-26890.

The present invention will be illustrated below in more detail by reference to the following Examples. It will be apparent to one skilled in the art that the ingredients, ingredient proportions, procedures, etc. shown below can be changed or modified without departing from the spirit of the invention.

Therefore the present invention should not be construed as being limited to the following Examples. In the Examples and Comparative Examples, all parts are by weight.

EXAMPLE I-1

Magnetic coating compositions [I] shown below were placed in a kneader and sufficiently kneaded. Magnetic coating compositions [II] were then added and the resulting mixture was sufficiently kneaded. Prior to coating, magnetic coating compositions [III] were added to the mixture and dispersed therein by mixing thereby to prepare a magnetic coating solution.

After viscosity was adjusted to the desired viscosity, the magnetic coating solution obtained was applied on a 7 μm-thick nonmagnetic poly(ethylene naphthalate) support (TD Young's modulus: 1,100 Kg/mm$^2$) at a dry thickness of 3 μm.

| Magnetic Coating Compositions | |
|---|---|
| [I] | |
| Ferromagnetic metal powder (Fe metal powder, Al content: 5 wt %, specific surface area (S$_{BET}$): 55 m$^2$/g) | 100 parts |
| Ester phosphate (phenyl phosphonate) | 2 parts |
| Oleic acid | 0.1 part |
| Vinyl chloride copolymer resin ("MR110", manufactured by Nippon Zeon Co., Ltd., Japan) | 7 parts |
| Polyurethane resin ("UR8200", manufactured by Toyobo Co., Ltd., Japan) | 4 parts |
| 2-Ethylhexyl palmitate | 0.6 part |
| Cyclohexanone | 60 parts |
| Methyl ethyl ketone | 80 parts |
| [II] | |
| Dispersion 1 | |
| Carbon black ("Conductex SC", manufactured by Cabot Corp.) | 1 part |
| Polyurethane resin ("UR8200", manufactured by Toyobo Co., Ltd.) | 1 part |
| Methyl ethyl ketone | 10 parts |
| Dispersion 2 | |
| Abrasive ("HIT55 [α-Al$_2$O$_3$]", manufactured by Sumitomo Chemical Co., Ltd.) | 13 parts |
| Vinyl chloride copolymer resin ("MR110", manufactured by Nippon Zeon Co., Ltd.) | 1 part |
| Cyclohexanone | 60 parts |
| Methyl ethyl ketone | 40 parts |
| [III] | |
| Polyisocyanate ("Coronate 3040", manufactured by Nippon Polyurethane Co., Ltd., Japan) | 8 parts |
| N,N-Dibutylstearic acid amide | 0.5 part |
| Palmitic acid | 0.5 part |
| Butoxyethyl stearate | 0.5 part |
| Methyl ethyl ketone | 50 parts |
| Toluene | 30 parts |

The nonmagnetic support on which the magnetic coating solution was coated was subjected to magnetic was in an undried state, followed by drying. Subsequently, backing layer-forming coating compositions [II] shown below were added to backing layer-forming coating compositions [I] shown below, just before the resulting coating composition was applied at a dry thickness of 0.6 μm on the back side of the support on which the magnetic coating solution had been applied.

| Backing layer-Forming Coating Compositions | |
|---|---|
| [I] | |
| Carbon black ("BP800", manufactured by Cabot Corp.) | 97 parts |
| Carbon black ("MTCI", manufactured by Cancarb Co., Ltd.) | 3 parts |
| α-Al$_2$O$_3$ ("HIT55", manufactured by Sumitomo Chemical Co., Ltd.) | 0.1 part |
| Barium sulfate ("BF1", manufactured by Sakai Chemical Industry Co., Ltd., Japan) | 0.1 part |
| 2-Ethylhexyl stearate | 0.5 part |
| Copper oleate | 0.1 part |
| Vinyl chloride copolymer resin ("MR110", manufactured by Nippon Zeon Co., Ltd.) | 50 parts |
| Polyurethane resin ("UR8300", manufactured by Toyobo Co., Ltd.) | 40 parts |
| Cyclohexanone | 200 parts |
| Methyl ethyl ketone | 300 parts |
| [II] | |
| Polyisocyanate ("Coronate 3040", manufactured by Nippon Polyurethane Co., Ltd.) | 20 parts |
| [III] | |
| Polyisocyanate ("Coronate 3040", manufactured by Nippon Polyurethane Co., Ltd.) | 20 parts |
| Methyl ethyl ketone | 3,500 parts |
| Toluene | 200 parts |
| Silicone compound ("KF69", manufactured by Shin-Etsu Chemical Co., Ltd.) | 0.1 part |

The coated nonmagnetic support was dried, and subsequently calendered five times at a temperature of 90° C., a linear pressure of 350 Kg/cm, and a speed of 200 m/min, to thereby produce a multilayered laminate including a nonmagnetic support, a magnetic layer, and a backing layer.

This multilayered laminate was heat-treated at 60° C. for 24 hours to cure the polyisocyanate compound contained in the structure, and was then slit into a ½ inch width. The resulting laminate was subjected to burnishing treatment to burnish the magnetic layer surface with a polishing tape ("K10000", manufactured by Fuji Photo Film Co., Ltd.), followed by wiping treatment with a wiping material ("WRP736", manufactured by Kuraray Co., Ltd.), to thereby produce a ½ inch video tape.

The magnetic layer of the thus-obtained multilayered laminate had a glass transition temperature of 95° C. and a surface roughness of 4 nm and the backing layer had a surface roughness of 6 nm.

EXAMPLE I-2

A magnetic coating composition was prepared in the same manner as in Example I-1 except that "UR5500" (manufactured by Toyobo Co., Ltd.) was used in place of the polyurethane resin used in the magnetic coating compositions [I] and [II] in Example 1.

After viscosity adjustment, the magnetic coating solution obtained was applied at a dry thickness of 3 μm on a 7 μm-thick nonmagnetic poly(ethylene naphthalate) support (TD Young's modulus: 1,500 Kg/mm$^2$).

The multilayered laminate thus-obtained was subjected to the same treatments as in Example I-1 to produce a ½ inch video tape. The magnetic layer of the thus-obtained multilayered laminate had a glass transition temperature of 90° C. and a surface roughness of 4.2 nm and the backing layer had a surface roughness of 6.5 nm.

EXAMPLE I-3

A magnetic coating composition was prepared in the same manner as in Example I-1 except that "UR8600" (manufactured by Toyobo Co., Ltd.) was used in place of the polyurethane resin used in the magnetic coating compositions [I] and [II] in Example 1.

After viscosity adjustment, the magnetic coating solution obtained was applied at a dry thickness of 3 μm on a 7 μm-thick nonmagnetic poly(ethylene naphthalate) support (TD Young's modulus: 1,800 Kg/mm$^2$).

The multilayered laminate thus-obtained was subjected to the same treatments as in Example I-1 to produce a ½ inch video tape. The magnetic layer of the thus-obtained multilayered laminate had a glass transition temperature of 85° C. and a surface roughness of 4.5 nm and the backing layer had a surface roughness of 7.0 nm.

COMPARATIVE EXAMPLE I-1

Magnetic coating compositions [I] shown below were placed in a kneader and sufficiently kneaded. Magnetic coating compositions [II] were then added and the resulting mixture was sufficiently kneaded. Prior to coating, magnetic coating compositions [III] were added to the mixture and dispersed therein by mixing thereby to prepare a magnetic coating solution.

After viscosity adjustment, the magnetic coating solution obtained was applied on a 7 μm-thick nonmagnetic poly(ethylene naphthalate) support (TD Young's modulus: 900 Kg/mm$^2$) at a dry thickness of 3 μm. Further, the same backing layer-forming coating composition as in Example I-1 was coated on the back side of the support.

| Magnetic Coating Compositions | |
|---|---|
| [I] | |
| Ferromagnetic metal powder (Fe metal powder, Al content: 5 wt %, specific surface area: (S$_{BET}$) 55 m$^2$/g) | 100 parts |
| Ester phosphate (phenyl phosphonate) | 2 parts |
| Oleic acid | 0.1 part |
| Vinyl chloride copolymer resin ("MR110", manufactured by Nippon Zeon Co., Ltd.) | 9.5 parts |
| Polyurethane resin ("UR8600", manufactured by Toyobo Co., Ltd.) | 5 parts |
| 2-Ethylhexyl palmitate | 0.6 part |
| Cyclohexanone | 60 parts |
| Methyl ethyl ketone | 80 parts |
| [II] | |
| Dispersion 1 | |
| Carbon black ("Conductex SC", manufactured by Cabot Corp.) | 1 part |
| Polyurethane resin ("UR8600", manufactured by Toyobo Co., Ltd.) | 1 part |
| Methyl ethyl ketone | 10 parts |
| Dispersion 2 | |
| Abrasive ("HIT55 [α-Al$_2$O$_3$]", manufactured by Sumitomo Chemical Co., Ltd.) | 13 parts |
| Vinyl chloride copolymer resin ("MR110", manufactured by Nippon Zeon Co., Ltd.) | 1 part |
| Cyclohexanone | 60 parts |
| Methyl ethyl ketone | 40 parts |
| [III] | |
| Polyisocyanate ("Coronate 3040", manufactured by Nippon Polyurethane Co., Ltd.) | 4.5 parts |
| N,N-Dibutylstearic acid amide | 0.5 part |
| Palmitic acid | 0.5 part |
| Butoxyethyl stearate | 0.5 part |
| Methyl ethyl ketone | 50 parts |
| Toluene | 30 parts |

The multilayered laminate thus-obtained was subjected to the same treatments as in Example I-1 to produce a ½ inch video tape. The magnetic layer of the thus-obtained multilayered laminate had a glass transition temperature of 70° C. and a surface roughness of 3.9 nm and the backing layer had a surface roughness of 7.5 nm.

COMPARATIVE EXAMPLE I-2

A multilayered laminate was produced in the same manner as in Comparative Example I-1 except that the nonmagnetic support used in Comparative Example I-1 was replaced with a nonmagnetic poly(ethylene naphthalate) support having a TD Young's modulus of 1,500 Kg/mm$^2$. The multilayered laminate obtained was subjected to the same treatments as in Example I-1 to produce a ½ inch video tape.

The magnetic layer of the thus-obtained multilayered laminate had a glass transition temperature of 70° C. and a surface roughness of 4.0 nm and the backing layer had a surface roughness of 8.0 nm.

COMPARATIVE EXAMPLE I-3

Magnetic coating compositions [I] shown below were placed in a kneader and sufficiently kneaded. Magnetic coating compositions [II] were then added and the resulting mixture was sufficiently kneaded. Prior to coating, magnetic coating compositions [III] were added to the mixture and dispersed therein by mixing to thereby prepare a magnetic coating solution.

After viscosity adjustment, the magnetic coating solution obtained was applied on a 7 μm-thick nonmagnetic poly(ethylene naphthalate) support (TD Young's modulus: 900 Kg/mm$^2$) at a dry thickness of 3 μm. Further, the same backing layer-forming coating composition as in Example I-1 was coated on the back side of the support.

| Magnetic Coating Compositions | |
|---|---|
| [I] | |
| Ferromagnetic metal powder (Fe metal powder, Al content: 5 wt %, specific surface area: (S$_{BET}$) 55 m$^2$/g) | 100 parts |
| Phosphoric acid ester (phenyl phosphonate) | 2 parts |
| Oleic acid | 0.1 part |
| Vinyl chloride copolymer resin ("MR110", manufactured by Nippon Zeon Co., Ltd.) | 7.5 parts |
| Polyurethane resin ("UR8200", manufactured by Toyobo Co., Ltd.) | 1.5 parts |
| 2-Ethylhexyl palmitate | 0.6 part |
| Cyclohexanone | 60 parts |
| Methyl ethyl ketone | 80 parts |
| [II] | |
| Dispersion 1 | |
| Carbon black ("Conductex SC", manufactured by Cabot Corp.) | 1 part |
| Polyurethane resin ("UR8200", manufactured by Toyobo Co., Ltd.) | 1 part |
| Methyl ethyl ketone | 10 parts |
| Dispersion 2 | |
| Abrasive ("HIT55 [α-Al$_2$O$_3$]", manufactured by Sumitomo Chemical Co., Ltd.) | 13 parts |
| Vinyl chloride copolymer resin ("MR110", manufactured by Nippon Zeon Co., Ltd.) | 1 part |
| Cyclohexanone | 60 parts |
| Methyl ethyl ketone | 40 parts |
| [III] | |
| Polyisocyanate ("Coronate 3040", manufactured by Nippon Polyurethane Co., Ltd.) | 8.5 parts |
| N,N-Dibutylstearic acid amide | 0.5 part |

-continued

| Magnetic Coating Compositions | |
|---|---|
| Palmitic acid | 0.5 part |
| Butoxyethyl stearate | 0.5 part |
| Methyl ethyl ketone | 50 parts |
| Toluene | 30 parts |

The multilayered laminate thus-obtained was subjected to the same treatments as in Example I-1 to produce a ½ inch video tape. The magnetic layer of the thus-obtained multilayered laminate had a glass transition temperature of 102° C. and a surface roughness of 4.4 nm and the backing layer had a surface roughness of 6.5 nm.

COMPARATIVE EXAMPLE I-4

A multilayered laminate was produced in the same manner as in Comparative Example I-3 except that the nonmagnetic support used in Comparative Example I-3 was replaced with a nonmagnetic poly(ethylene naphthalate) support having a TD Young's modulus of 1,500 Kg/mm². The multilayered laminate obtained was subjected to the same treatments as in Example I-1 to produce a ½ inch video tape.

The magnetic layer of the thus-obtained multilayered laminate had a glass transition temperature of 102° C. and a surface roughness of 4.3 nm and the backing layer had a surface roughness of 5.5 nm.

COMPARATIVE EXAMPLE I-5

A multilayered laminate was produced in the same manner as in Comparative Example I-3 except that the ferromagnetic metal powder used in Comparative Example I-3 was replaced with a ferromagnetic metal powder having a specific surface area ($S_{BET}$) of 45 m²/g. The multilayered laminate obtained was subjected to the same treatments as in Example I-1 to produce a ½ inch video tape.

The magnetic layer of the thus-obtained multilayered laminate had a glass transition temperature of 102° C. and a surface roughness of 5.0 nm and the backing layer had a surface roughness of 6 nm.

Evaluation Methods

Output Difference:

Using a D3 VTR, "AJ-D350P" manufactured by Matsushita Electric Industrial Co., Ltd., Japan (core width, 130 μm; relative speed of magnetic head and tape, 21.4 m/sec), the tapes obtained were subjected at 25° C. and 70% relative humidity (RH) to recording/reproduction of color bar signals generated by a color signal generator "TS-170D" manufactured by Sony Techtronics Co., Ltd. The reproduced output waveforms for all of the four channels were analyzed with a spectrum analyzer "TR4171" (manufactured by Advantest Co., Ltd.) to determine the average output, which was compared with the average output of a standard tape measured in the same manner to thereby determine an output difference between the two samples.

Dropout (DO):

Using a D3 VTR, "AJ-D350P" manufactured by Matsushita Electric Industrial Co., Ltd. (core width, 130 μm), the tapes obtained from the foregoing examples were subjected at 25° C. and 50% RH to recording/reproduction of color bar signals generated by a color signal generator, "TS-170OD" manufactured by Sony Techtronics Corp. Using a DO counter, "VH02AZ" manufactured by Shibasoku Co., Ltd., −8 dB or greater output decreases which lasted for at least 0.2 μsec were counted in each 10 seconds over a period of 10 minutes. The counted numbers were averaged. The results obtained are shown in Table I-1.

TABLE I-1

| | Total thickness of magnetic recording medium (μm) | Transverse-direction Young's modulus of base (kg/mm²) | Tg (°C.) | Output difference (dB) | DO (per 10 sec) |
|---|---|---|---|---|---|
| Example I-1 | 10.6 | 1100 | 95 | +0.2 | 20 |
| Example I-2 | 10.6 | 1500 | 90 | +0.4 | 35 |
| Example I-3 | 10.6 | 1800 | 85 | +0.0 | 40 |
| Comparative Example I-1 | 10.6 | 900 | 70 | −4.8 | 25 |
| Comparative Example I-2 | 10.6 | 1500 | 70 | −1.2 | 30 |
| Comparative Example I-3 | 10.6 | 900 | 102 | −0.6 | 180 |
| Comparative Example I-4 | 10.6 | 1500 | 102 | +0.5 | 150 |
| Comparative Example I-5 | 10.6 | 1500 | 102 | +0.1 | 190 |

As is apparent from the results of Table I-1, the magnetic recording media of the present invention, which are thin tapes having a total thickness of less than 12 μm, have improved head contacting properties and can achieve high output with diminished dropouts, because the transverse-direction Young's moduli of their nonmagnetic supports are at least 1,000 Kg/mm² and the glass transition temperatures ($T_g$) of their magnetic layers are from 80° C. to 100° C. Thus, the present invention is significantly superior to conventional magnetic tapes.

EXAMPLE II-1

Magnetic coating compositions [I] shown below were placed in a kneader and sufficiently kneaded. Magnetic coating compositions [II] were then added and the resulting mixture was sufficiently kneaded. Prior to coating, magnetic coating compositions [III] were added to the mixture and dispersed therein by mixing to thereby prepare a magnetic coating solution.

After viscosity was adjusted to the desired viscosity, the magnetic coating solution obtained was applied on a 7 μm-thick nonmagnetic poly(ethylene naphthalate) support (TD Young's modulus: 1,100 Kg/mm²) at a dry thickness of 3 μm.

| Magnetic Coating Compositions | |
|---|---|
| [I] | |
| Ferromagnetic metal powder (Fe metal | 100 parts |

| Magnetic Coating Compositions | |
|---|---|
| powder, Al content: 5 wt %, specific surface area: ($S_{BET}$) 55 m$^2$/g) | |
| Phosphoric acid ester (phenyl phosphonate) | 2 parts |
| Vinyl chloride copolymer resin ("MR110", manufactured by Nippon Zeon Co., Ltd.) | 11 parts |
| Polyurethane resin ("UR8200", manufactured by Toyobo Co., Ltd.) | 4.5 parts |
| 2-Ethylhexyl palmitate | 0.6 part |
| Cyclohexanone | 60 parts |
| Methyl ethyl ketone | 80 parts |
| [II] Dispersion 1 | |
| Carbon black ("Conductex SC", manufactured by Cabot Corp.) | 1 part |
| Polyurethane resin ("UR5500", manufactured by Toyobo Co., Ltd.) | 1 part |
| Methyl ethyl ketone | 10 parts |
| Dispersion 2 | |
| Abrasive ("HIT55 [α-Al$_2$O$_3$]", manufactured by Sumitomo Chemical Co., Ltd.) | 13 parts |
| Vinyl chloride copolymer resin ("MR110", manufactured by Nippon Zeon Co., Ltd.) | 1 part |
| Cyclohexanone | 60 parts |
| Methyl ethyl ketone | 40 parts |
| [III] | |
| Polyisocyanate ("Coronate 3040", manufactured by Nippon Polyurethane Co., Ltd.) | 8 parts |
| N,N-Dibutylstearic acid amide | 0.5 part |
| Stearic acid | 0.5 part |
| Butoxyethyl stearate | 0.5 part |
| Methyl ethyl ketone | 50 parts |
| Toluene | 30 parts |

The nonmagnetic support on which the magnetic coating solution had been coated was subjected to magnetic orientation treatment while the magnetic coating solution was in an undried state, followed by drying. Subsequently, the same backing layer-forming coating compositions [II] as those used in Example I-1 were added to the same backing layer-forming coating compositions [I] as those used in Example I-1, just before the resulting coating composition was applied at a dry thickness of 0.6 μm on the back side of the support on which the magnetic coating solution had been applied.

The resulting laminate was dried, and subsequently calendered three times using a supercalender of the construction shown below at a temperature of 80° C., a linear pressure of 100 Kg/cm, and a speed of 200 m/min, to thereby produce a multilayered laminate including a nonmagnetic support, a magnetic layer, and a backing layer.

| Construction of Supercalender: Three-roll calender | | |
|---|---|---|
| | Roll material | Shore hardness |
| Upper | metal roll | 80–85° |
| Middle | metal roll (variable crown shape) | 80–85° |
| Lower | metal roll | 80–85° |

This multilayered laminate was heat-treated at 60° C. for 24 hours to cure the polyisocyanate compound contained in the structure, and was then slit into a ½ inch width. The resulting laminate was subjected to burnishing treatment to burnish the magnetic layer surface with a polishing tape ("K10000", manufactured by Fuji Photo Film Co., Ltd.), followed by wiping treatment with a wiping material ("WRP736", manufactured by Kuraray Co., Ltd.), to thereby produce a ½ inch video tape.

The total void volume in the thus-obtained multilayered laminate was measured with an Autosorb-1 (manufactured by Yuasa Ionics Co., Ltd.) after evacuation to $1 \times 10^{-6}$ Torr or less. The surface void content of the magnetic layer was determined from the total void volume value and was found to be 23 volume %.

EXAMPLE II-2

A magnetic coating composition was prepared in the same manner as in Example II-1 except that the transverse-direction Young's modulus of the 7 μm-thick nonmagnetic poly(ethylene naphthalate) support used in Example II-1 was changed to 1,500 Kg/mm$^2$.

The multilayered laminate obtained by the same manner as in Example II-1 except for using the above magnetic coating composition was subjected to the same treatments as in Example II-1 to produce a ½ inch video tape. The magnetic layer of the thus-obtained multilayered laminate had a surface void content of 22 volume %.

EXAMPLE II-3

A magnetic coating composition was prepared in the same manner as in Example II-1 except that the transverse-direction (TD) Young's modulus of the 7 μm-thick nonmagnetic poly(ethylene naphthalate) support used in Example II-1 was changed to 1,800 Kg/mm$^2$.

The multilayered laminate obtained by the same manner as in Example II-1 except for using the above magnetic coating composition was subjected to the same treatments as in Example II-1 to produce a ½ inch video tape. The magnetic layer of the thus-obtained multilayered laminate had a surface void content of 23 volume %.

EXAMPLE II-4

A ½ inch video tape was produced under the same conditions as in Example II-1 except that the linear pressure during calendering was changed to 150 Kg/cm. The magnetic layer of the thus-obtained multilayered laminate had a surface void content of 18 volume %.

EXAMPLE II-5

A ½ inch video tape was produced under the same conditions as in Example II-1 except that the temperature during calendering was changed to 50° C. The magnetic layer of the thus-obtained multilayered laminate had a surface void content of 18 volume %.

COMPARATIVE EXAMPLE II-1

A magnetic coating composition was prepared in the same manner as in Example II-1 except that the transverse-direction (TD) Young's modulus of the 7 μm-thick nonmagnetic poly(ethylene naphthalate) support was changed to 900 Kg/mm$^2$.

The multilayered laminate obtained by the same manner as in Example II-1 except for using the above magnetic coating compositions was calendered three times in the same manner as in Example II-1 except that the middle roll was replaced with an epoxy resin roll (hardness 100 (Rockwell M scale)) and the linear pressure and the calendering speed during calendering were changed to 300 Kg/cm and 200 m/min, respectively, to thereby produce a ½ inch video tape. The magnetic layer of the thus-obtained multilayered laminate had a surface void content of 25 volume %.

COMPARATIVE EXAMPLE II-2

A multilayered laminate was produced in the same manner as in Comparative Example II-1 except that the nonmagnetic support was replaced with a nonmagnetic poly(ethylene naphthalate) support having a transverse-direction (TD) Young's modulus of 1,500 Kg/mm$^2$. The multilayered laminate obtained was subjected to the same treatments as in Comparative Example II-1 to produce a ½ inch video tape.

The thus-obtained multilayered laminate had a surface void content of 25 volume %.

COMPARATIVE EXAMPLE II-3

A multilayered laminate was produced in the same manner as in Comparative Example II-1 except that the nonmagnetic support was replaced with a nonmagnetic poly(ethylene naphthalate) support having a transverse-direction (TD) Young's modulus of 1,800 Kg/mm$^2$. The multilayered laminate obtained was subjected to the same treatments as in Comparative Example II-1 to produce a ½ inch video tape.

The thus-obtained multilayered laminate had a surface void content of 26 volume %.

COMPARATIVE EXAMPLE II-4

A multilayered laminate was produced in the same manner as in Comparative Example II-1 and was then subjected to the same treatments as in Example II-1, to thereby produce a ½ inch video tape.

The thus-obtained multilayered laminate had a surface void content of 23 volume %.

COMPARATIVE EXAMPLE II-5

A multilayered laminate was produced in the same manner as in Comparative Example II-1 and was then subjected to the same treatments as in Example II-1, to thereby produce a ½ inch video tape.

The calendering of the multilayered laminate obtained was conducted using, as the middle roll, a metal roll (Shore hardness: 80°–85°; the roll was the same in original roll shape as that used in Example II-1 but the crown shape thereof was not variable because the hydraulic pressure in the roll was uncontrollable) at a linear pressure of 300 Kg/cm and a temperature of 80° C.

The magnetic layer of the thus-obtained multilayered laminate had a surface void content of 10 volume %.

COMPARATIVE EXAMPLE II-6

A ½ inch video tape was produced in the same manner as in Comparative Example II-5 except that the nonmagnetic support was replaced with a nonmagnetic poly(ethylene naphthalate) support having a transverse-direction (TD) Young's modulus of 1,500 Kg/mm$^2$.

The thus-obtained multilayered laminate had a surface void content of 10 volume %.

COMPARATIVE EXAMPLE II-7

A ½ inch video tape was produced in the same manner as in Comparative Example II-5 except that the nonmagnetic support was replaced with a nonmagnetic poly(ethylene naphthalate) support having a transverse-direction (TD) Young's modulus of 1,800 Kg/mm$^2$.

The thus-obtained multilayered laminate had a surface void content of 9 volume %.

COMPARATIVE EXAMPLE II-8

A multilayered laminate was produced in the same manner as in Example II-2. The multilayered laminate obtained was calendered only once using the same calender construction as in Comparative Example II-2 at a temperature of 25° C., a linear pressure of 100 Kg/cm, and a speed of 300 m/min, to thereby produce a ½ inch video tape. The thus-obtained multilayered laminate had a surface void content of 40 volume %.

Evaluation Methods

Packing density:
Residual magnetic flux density (hereinafter referred to as "$B_r$") was measured with a VSM (Vibrating Sample Magnetometer).

Output:
Using the measuring apparatus shown below, the video signal output (which corresponds to head contact) of the tape samples produced were measured.

Measuring Apparatus

D3 VTR "AJ-D350P", manufactured by Matsushita Electric Industrial Co., Ltd.
  core width: 130 μm
  magnetic head/tape relative speed: 21.4 m/sec
Color signal generator "TS-170D", manufactured by Sony Techtronics Corp.
Spectrum analyzer "TR4171", manufactured by Advantest Co., Ltd.

Video Signal-Measuring Method

Color bar signals were sent from the color signal generator to the D3 VTR and recorded on the tapes. The recorded signals were reproduced and the reproduced output waveforms were analyzed with the spectrum analyzer. The outputs were measured with respect to all of the four channels and averaged. The spectrum analyzer was set to operate under the following conditions, and the output values at a frequency of 27.5 MHz were read and compared.
RBW (Resolution Band Width)
  100 kHz; sweeping time 100 msec; starting frequency 0 MHz
VBW (Video Band Width)
  10 kHz; average value of 128 times; stopping frequency 50 MHz
The outputs obtained are shown in Table II-1, with the output for Example II-1 being 0 dB.

TABLE II-1

| | Total thickness of magnetic recording medium (μm) | Transverse-direction Young's modulus of base (kg/mm$^2$) | Br (gauss) | Output (dB) | Surface void content (%) |
|---|---|---|---|---|---|
| Example II-1 | 10.6 | 1100 | 2800 | +0.0 | 23 |
| Example II-2 | 10.6 | 1500 | 2830 | +0.4 | 22 |
| Example II-3 | 10.6 | 1800 | 2850 | +0.7 | 23 |
| Example II-4 | 10.6 | 1100 | 2950 | +0.2 | 18 |
| Example II-5 | 10.6 | 1100 | 2810 | +0.2 | 32 |

TABLE II-1-continued

|  | Total thickness of magnetic recording medium (μm) | Transverse-direction Young's modulus of base (kg/mm²) | Br (gauss) | Output (dB) | Surface void content (%) |
| --- | --- | --- | --- | --- | --- |
| Comparative Example II-1 | 10.6 | 900 | 2630 | −1.2 | 29 |
| Comparative Example II-2 | 10.6 | 1500 | 2700 | −0.8 | 32 |
| Comparative Example II-3 | 10.6 | 1800 | 2670 | −0.5 | 31 |
| Comparative Example II-4 | 10.6 | 900 | 2700 | −0.8 | 23 |
| Comparative Example II-5 | 10.6 | 900 | 3200 | −5.0 | 10 |
| Comparative Example II-6 | 10.6 | 1500 | 2980 | −3.0 | 10 |
| Comparative Example II-7 | 10.6 | 1800 | 3200 | −2.0 | 9 |
| Comparative Example II-8 | 10.6 | 1500 | 2150 | −2.2 | 40 |

As is apparent from the results of Table II-1, the magnetic recording media of the present invention, which are thin tapes having a total thickness of less than 12 μm, have improved head contacting properties and can achieve high output, because the transverse-direction Young's moduli of their nonmagnetic supports are at least 1,000 Kg/mm, and the surface void contents of their magnetic layers are in the range of from 15 to 35 volume %. Thus, magnetic recording media in accordance with the present invention is significantly superior to conventional magnetic recording media. The magnetic recording media of Comparative Examples II-1 to II-3 have insufficient $B_r$, probably because they had undergone calendering under ordinary conditions. The magnetic recording media of Comparative Examples II-5 to II-7 had too low a surface void content and attained no improvement in output, because the metal roll used as a middle roll was not a crown shape-variable type. The magnetic recording medium of Comparative Example II-4 failed to achieve output improvement due to the low transverse-direction Young's modulus of the nonmagnetic support.

As described above, the present invention provides a thin, tape-form magnetic recording medium which has a total thickness of less than 12 μm and which, when used with a VTR, especially a digital VTR, equipped with a wide head having a sliding surface width of at least 80 μm, as measured along a direction perpendicular to the scan direction, has improved head contacting properties and high output with reduced residual dropouts. This is preferably accomplished with a magnetic recording medium which includes a nonmagnetic support and formed thereon a magnetic layer comprising ferromagnetic particles, a binder, additives, and an abrasive having a Mobs' hardness of preferably at least 8 and is characterized in that the nonmagnetic support has a transverse-direction Young's modulus of at least 1,000 Kg/mm², and the magnetic layer having a glass transition temperature of from 80° to 100° C. Moreover, an even higher output can be obtained when the ferromagnetic particles in the magnetic layer are fine metal particles having a specific surface area of at least 47 m²/g, and the magnetic layer has a surface roughness of 1.5 to 4.5 rim. Furthermore, good running durability can be obtained when a backing layer having a surface roughness of from 2 to 10 nm is provided on the back side of the nonmagnetic support on which the magnetic layer has been formed.

By regulating the magnetic layer of the above-described magnetic recording medium so as to have a surface void content of from 15 to 35 volume %, a thin, tape-form magnetic recording medium can be provided which has a total thickness of less than 12 μm and which, when used with a VTR, especially a digital VTR, equipped with a wide head having a sliding surface width of at least 80 μm as measured along a direction perpendicular to the scan direction, which has improved head contacting properties and high output. Moreover, an even higher output can be obtained when the ferromagnetic particles in the magnetic layer are fine metal particles having a specific surface area of at least 47 m²/g, and the magnetic layer has a surface roughness of from 1.5 to 4.5 nm and a residual magnetic flux density of at least 2,800 gauss. Furthermore, good running durability can be obtained when a backing layer having a surface roughness of from 2 to 15 nm is provided on the back side of the nonmagnetic support on which the magnetic layer has been formed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer, said magnetic layer comprising ferromagnetic particles and a binder, wherein said nonmagnetic support has a transverse-direction Young's modulus of at least 1,000 Kg/mm², said magnetic layer has a glass transition temperature of 80° to 100° C., and said magnetic recording medium has a total thickness of less than 12 μm.

2. In combination, a magnetic recording medium comprising a nonmagnetic support having thereon a magnetic layer, said magnetic layer comprising ferromagnetic particles and a binder, wherein said nonmagnetic support has a transverse-direction Young's modulus of at least 1,000 Kg/mm², said magnetic layer has a glass transition temperature of from 80° to 100° C., and said magnetic recording medium has a total thickness of less than 12 μm; and a magnetic head having a core width of at least 100 μm.

3. A magnetic recording medium as claimed in claim 1, wherein said magnetic layer has a surface void content of from 15 to 35 volume % and a residual magnetic flux density of at least 2,800 gauss.

4. A magnetic recording medium as claimed in claim 2, wherein said magnetic layer has a surface void content of from 15 to 35 volume % and a residual magnetic flux density of at least 2,800 gauss.

5. A magnetic recording medium as claimed in claim 1, wherein said magnetic layer has a center-line mean surface roughness of 1.5 to 4.5 nm (cut-off value: 0.25 mm).

6. A magnetic recording medium as claimed in claim 2, wherein said magnetic layer has a center-line mean surface roughness of 1.5 to 4.5 nm (cut-off value: 0.25 mm).

7. A magnetic recording medium as claimed in claim 1, wherein said ferromagnetic particles are ferromagnetic metal particles having a specific surface area of at least 47 $m^2/g$.

8. A magnetic recording medium as claimed in claim 2, wherein said ferromagnetic particles are ferromagnetic metal particles having a specific surface area of at least 47 $m^2/g$.

9. A magnetic recording medium as claimed in claim 1, further comprising a backing layer provided on a side of said nonmagnetic support opposite to said magnetic layer, said backing layer having a center-line mean surface roughness of 2 to 10 nm (cut-off value: 0.25 mm).

10. A magnetic recording medium as claimed in claim 2, further comprising a backing layer provided on a side of said nonmagnetic support opposite to said magnetic layer, said backing layer having a center-line mean surface roughness of 2 to 10 nm (cut-off value: 0.25 mm).

* * * * *